April 26, 1966 A. J. LAGERMAN 3,247,930
CRANE CAB SAFETY BRAKE
Filed March 31, 1964 6 Sheets-Sheet 1

INVENTOR.
ALBERT J. LAGERMAN
BY
ATTORNEY

April 26, 1966 A. J. LAGERMAN 3,247,930
CRANE CAB SAFETY BRAKE
Filed March 31, 1964 6 Sheets-Sheet 3

INVENTOR.
ALBERT J. LAGERMAN
BY
ATTORNEY

April 26, 1966 A. J. LAGERMAN 3,247,930
CRANE CAB SAFETY BRAKE
Filed March 31, 1964 6 Sheets-Sheet 4
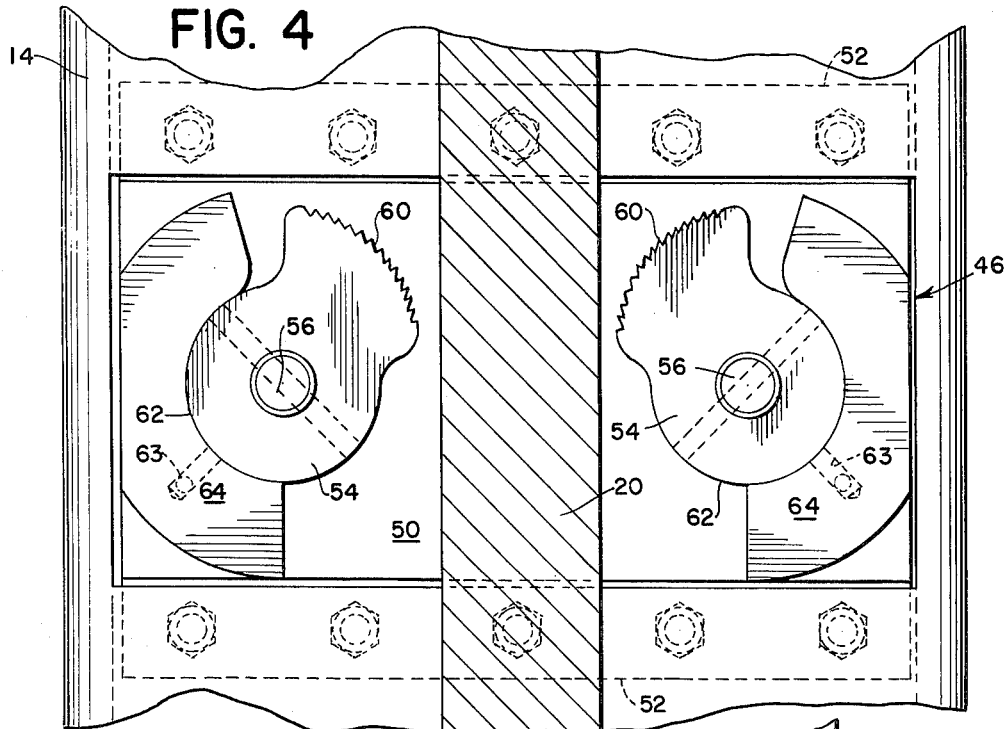
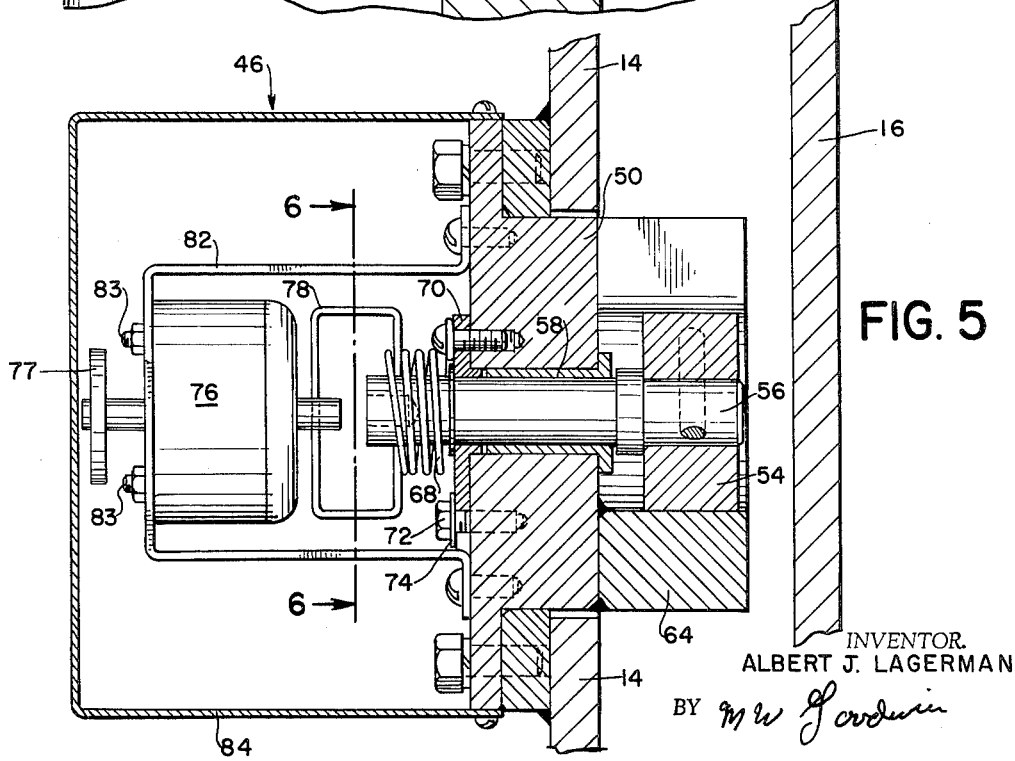
INVENTOR.
ALBERT J. LAGERMAN
BY
ATTORNEY April 26, 1966  A. J. LAGERMAN  3,247,930
CRANE CAB SAFETY BRAKE
Filed March 31, 1964  6 Sheets-Sheet 5

INVENTOR
ALBERT J. LAGERMAN
BY
ATTORNEY

April 26, 1966   A. J. LAGERMAN   3,247,930
CRANE CAB SAFETY BRAKE
Filed March 31, 1964   6 Sheets-Sheet 6

INVENTOR.
ALBERT J. LAGERMAN
BY
ATTORNEY

United States Patent Office 3,247,930
Patented Apr. 26, 1966

3,247,930
CRANE CAB SAFETY BRAKE
Albert J. Lagerman, Milwaukee, Wis., assignor, by mesne assignments, to Dresser Industries Inc., Dallas, Tex., a corporation of Delaware
Filed Mar. 31, 1964, Ser. No. 356,312
13 Claims. (Cl. 187—73)

This invention relates to novel and improved means for preventing injury to the operator of an overhead material handling device, such as a crane, when the operator's cab is mounted for vertical movement. The invention is particularly adapted for use in connection with stacker cranes wherein the operator's cab is mounted for movement with the material supporting assembly of the stacker crane over all or a part of the vertical movement of the material supporting assembly.

A stacker crane of known construction comprises a bridge assembly mounted for movement longitudinally of and on a pair of parallel rails or other supporting means. A depending mast assembly is supported by the bridge and may be fixed relative thereto or mounted for translational movement at right angles to the direction of movement of the bridge and/or for rotational movement about the longitudinal axis of the mast assembly. The mast assembly may comprise a single elongated member along which, for example, a fork assembly travels vertically, or the mast assembly may comprise a plurality of telescoping members or mast sections with the fork assembly being carried by or supported on the lowermost of the telescoping members. It is more or less conventional to provide an operator's cab for movement with the fork assembly over at least a portion of the vertical travel of the fork assembly. More specifically, the cab may be mounted in fixed relation vertically relative to the fork assembly, or it may be carried by an intermediate one of a plurality of telescoping mast members or it may be supported in a manner whereby it is carried by an intermediate mast member over a portion of the vertical movement of the fork assembly and by the fork assembly over another portion of the movement of the fork assembly. The fork assembly of a stacker crane is conventionally supported by flexible means, such as a cable which is dead ended on a cable drum supported on the bridge assembly and suitably connected to the fork assembly whereby rotation of the cable drum will effect lifting of the fork assembly and controlled release of the drum will permit the fork assembly to lower under the effect of gravity. In the operation of the crane with the cab being supported, for example, on the fork assembly, if the lifting cable or any other portion of the drive means should fail or become ineffective in a manner which would permit the fork assembly and thus the cab to fall, it will be apparent that serious injury to the crane operator could result. Also, of course, if the fork assembly or material handling means is at the time of failure carrying a load, the load would be seriously damaged, if not destroyed, should the fork assembly be permitted to fall due to failure of the drive means.

Accordingly, it is the primary object of this invention to provide novel and improved means to prevent falling of the operator's cab of the stacker crane or the like in the event that the drive means for effecting lifting of the cab fails or otherwise becomes ineffective to support the cab.

It is the further object of this invention to provide novel and improved means also to prevent dropping of the material handling assembly or forks of a stacker crane in the event that the drive means for effecting lifting of the material handling means fails or otherwise becomes ineffective to support the same.

It is still another object of the present invention to provide such novel and improved means for the prevention of falling of the material handling means and/or operator's cab of a stacker crane or the like which is adapted to be actuated in a variety of manners and which is fail safe.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 4 is a cross-sectional view substantially along the line 4—4 of FIG. 3;

FIG. 5 is a cross-sectional view substantially along the line 5—5 of FIG. 3;

Figure 1:
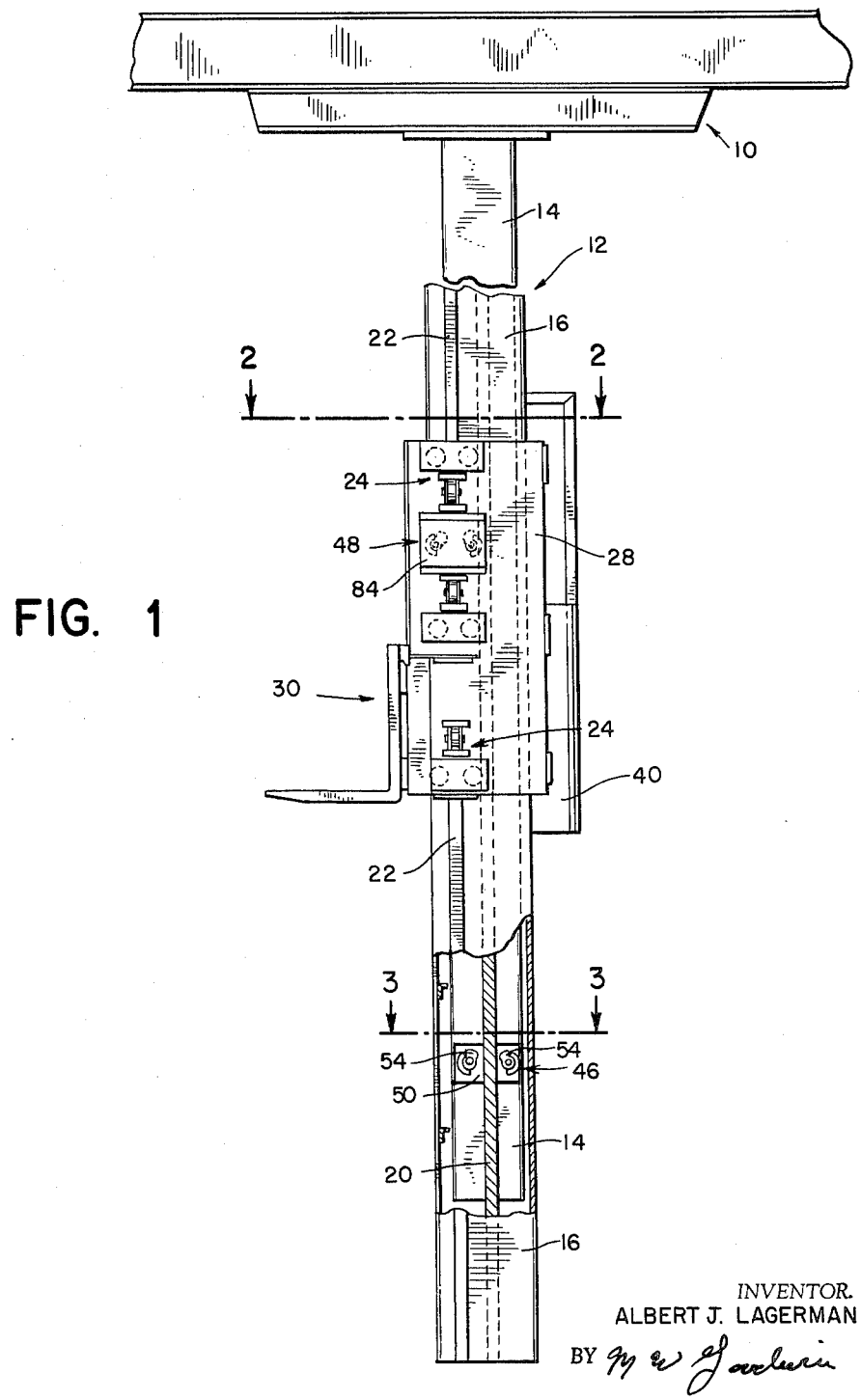
FIG. 1 is a fragmentary side elevational view, partly in section, of an exemplary stacker crane incorporating the present invention.
Figure 2:
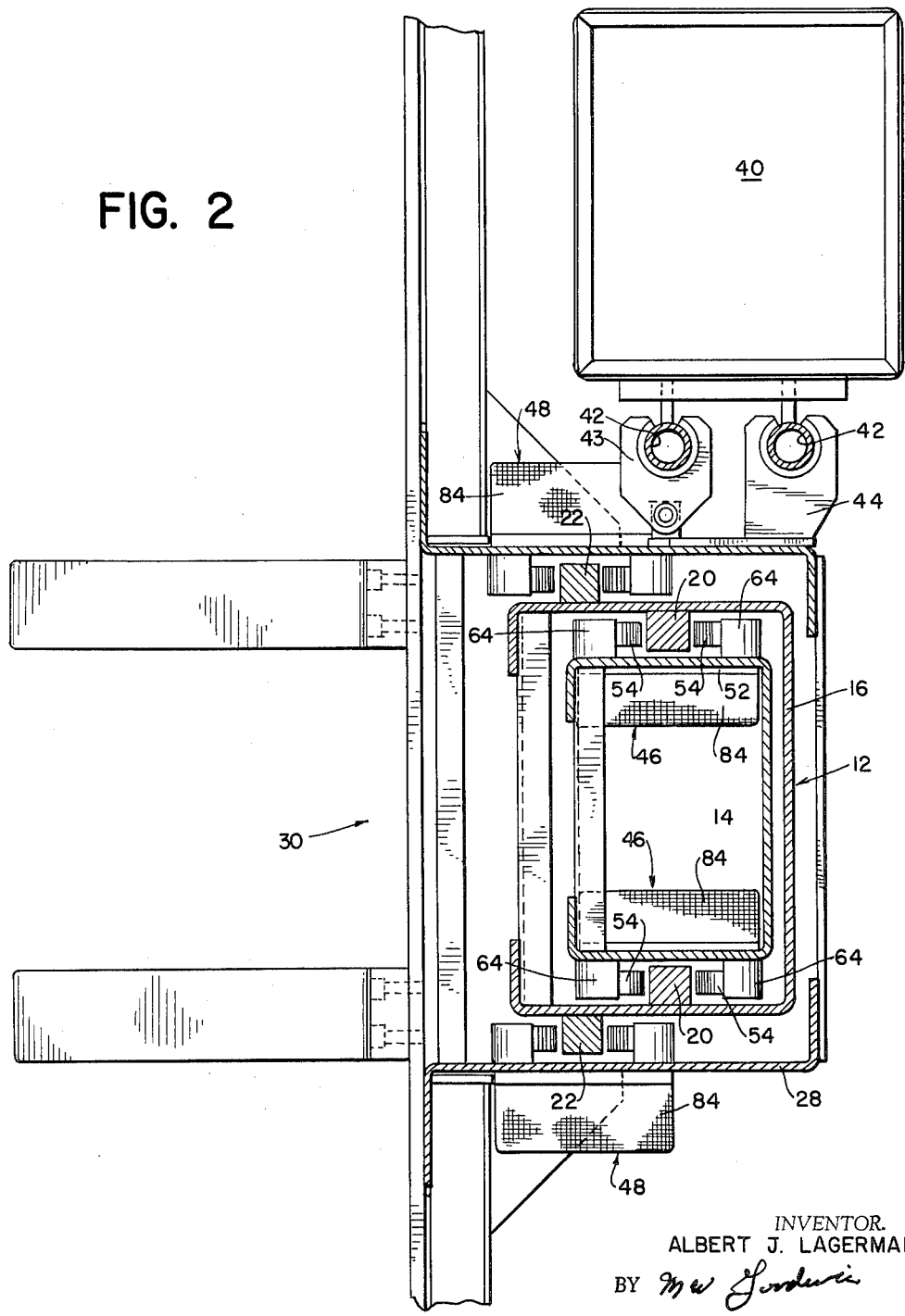
FIG. 2 is an enlarged cross-sectional view substantially along the line 2—2 of FIG. 1.
Figure 3:
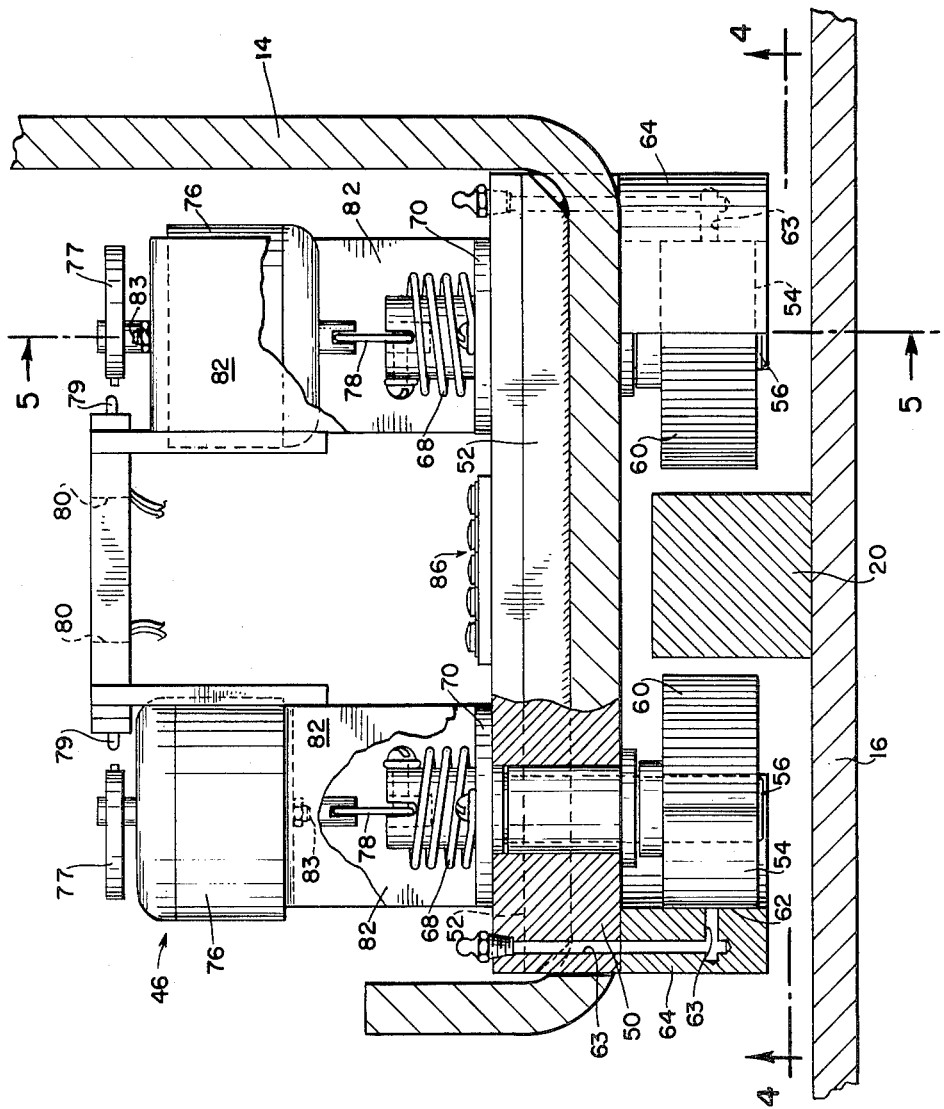
FIG. 3 is an enlarged cross-sectional view substantially along the line 3—3 of FIG. 1.

With reference to the drawings and particularly FIGS. 1 and 2, an exemplary stacker crane with which this invention is adapted for use comprises a bridge assembly or the like generally indicated at 10. The bridge assembly is suitably mounted and driven in a manner well known to those skilled in the art for horizontal movement, for example, along a pair of parallel rails. Depending from the bridge assembly 10 is a mast assembly generally indicated at 12 and comprising a fixed mast section 14 which is suitably supported on the bridge assembly so as to be fixed vertically relative to the bridge assembly. The mast assembly further comprises an intermediate mast section 16 which is guided for vertical movement on the fixed mast section 14. Both of the mast sections are generally tubular having a rectangular hollow cross-section whereby the intermediate mast section 16 is telescopically arranged over the fixed mast section 14. The fixed mast section carries a plurality of guide rollers (not shown) which are engageable respectively with a pair of guide rails 20 extending longitudinally of and carried by the inner wall of the intermediate mast section. The intermediate mast section has a second pair of guide rails 22 extending longitudinally thereof and located on the outer wall of the intermediate mast section. The rails 22 are engageable by rollers such as at 24 on a third mast section 28 forming a part of a material supporting or fork assembly 30. The third mast section 28 is also generally horizontal in cross section and is hollow so as to be telescopically arranged over the intermediate mast section 16. The material supporting assembly 30 in the specific embodiment comprises a plurality of forks for lifting material, although other suitable material supporting means could be provided.

The fork assembly 30 and the intermediate mast section 16 are both supported for movement vertically of the fixed mast section by lifting cables (not shown) which are dead ended at one end on a cable drum (not shown) having its axis of rotation fixed relative to the fixed mast section 14. Suitable means are provided for driving the cable drum, such as an electric motor and gear reduction.

The particular arrangement for drivingly connecting the cables to the fork assembly and intermediate mast is not shown as it is not a material part of the invention and any number of well known arrangements might be used. It will be apparent though to those skilled in the art that as the cable drum is rotated so as to wind the cables onto the drum, the fork assembly and the intermediate mast section will be lifted and on controlled release of the drum the fork assembly and intermediate mast section will be lowered.

The operation of the crane is controlled by an operator located in the cab 40 which suitably mounts a pair of tubular members 42 extending parallel to the mast. The tubes 42 are slidably received in brackets 43, 44 on the fork assembly 30 whereby the fork assembly is movable vertically relative to the cab. In the particular crane embodiment shown, when the fork assembly and intermediate mast section are in their lowermost positions, the cab is supported on the intermediate mast section and, at least in part, is spaced above the fork assembly 30. However, upon lifting of the fork assembly a sufficient distance, the fork assembly will engage the cab whereupon continued upward vertical movement of the fork assembly will effect upward movement of the cab assembly with the operator being disposed generally at eye level with the forks. It will thus be apparent that during a lifting operation should the cables fail or should any other part of the drive mechanism for lifting the fork assembly and intermediate mast section fail or become ineffective in a manner which would cause the intermediate mast and fork assembly to fall, serious injury could result to the crane operator and additionally the work being carried by the fork assembly could be destroyed or seriously damaged. In accordance with the invention, and as shown in FIG. 1, brake means 46 are provided between the intermediate and fixed mast section and brake means 48 are provided between the fork assembly and intermediate mast section whereby the fixed and intermediate mast section and fork assembly may be locked as a unit in the event of a failure as mentioned above, thus preventing falling of either the fork assembly or the cab. Inasmuch as the brake means 46 and 68 are substantially identical in structure and operation, only the brake means 46 will be hereinafter described in detail.

With particular reference to FIGS. 3 to 7, the brake means 46 comprises a base plate or cam block 50 which, as clearly shown in FIG. 5, is bolted to a pair of retainer bars 52 welded to the fixed mast section 14. The retainer bars are located adjacent bordering edge portions of a cutout in the mast section 14 through which a portion of the cam block 50 extends. The cam block 50 is bolted to the retainer bars which provide a positive location of the device at installation and permits removal and re-installation accurately and expeditiously. It will also be observed that the portion of the cam block 50 which projects into the cutout in the mast is engaged at the upper and lower sides thereof with corresponding sides of the horizontally extending retainer bars whereby the vertical shear load on the bolts retaining the cam block to the retainer bars is reduced if not eliminated.

The brake means further comprises a pair of eccentric cams 54 each mounted on and pinned to a shaft 56 which is journalled in a bearing 58 on the cam block 50. The cams 54 are disposed on opposite sides of the guide bar 20 on the intermediate mast section. In the specific embodiment, and as shown in FIG. 2, a brake means 46 and 48 is disposed on opposite sides of each of the fixed mast section 14 and mast section 28 of the fork assembly. However, only one of such locking means is being described in detail, it being understood that the others are substantially identical in structure and function.

Each of the cams 54 has a toothed gripping or wedging surface 60 which is generally arcuate and arranged eccentrically about the axis of the cam. Each cam further has an arcuate surface 62 which is arranged concentrically of the cam axis and is supported by a raised portion 64 on the cam block which has a parti-spherical surface which is complementary to and engageable with the surface 62 of the cam to support the radial load on the cam when the cam is engaged with the guide bar 20.

In this connection, it will be noted that the cam supporting surfaces generally face the next adjacent side of the associated guide bar. As can most clearly be shown in FIGS. 3 and 5, the cams are located on the side of the cam block next adjacent the intermediate mast 16 section and the shafts 54 extend through the cam block and terminate on the sides thereof opposite the cams. In order to provide lubrication for the cams, the cam block is provided with internal lubricating passages 63 connecting at one end with the cams and at the other ends provided with grease fittings.

Figure 6:
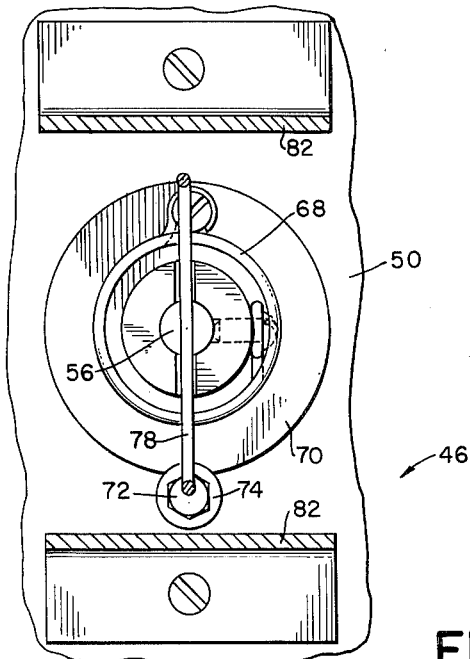
FIG. 6 is an enlarged fragmentary cross-sectional view substantially along the line 6—6 of FIG. 5.
Figure 7:
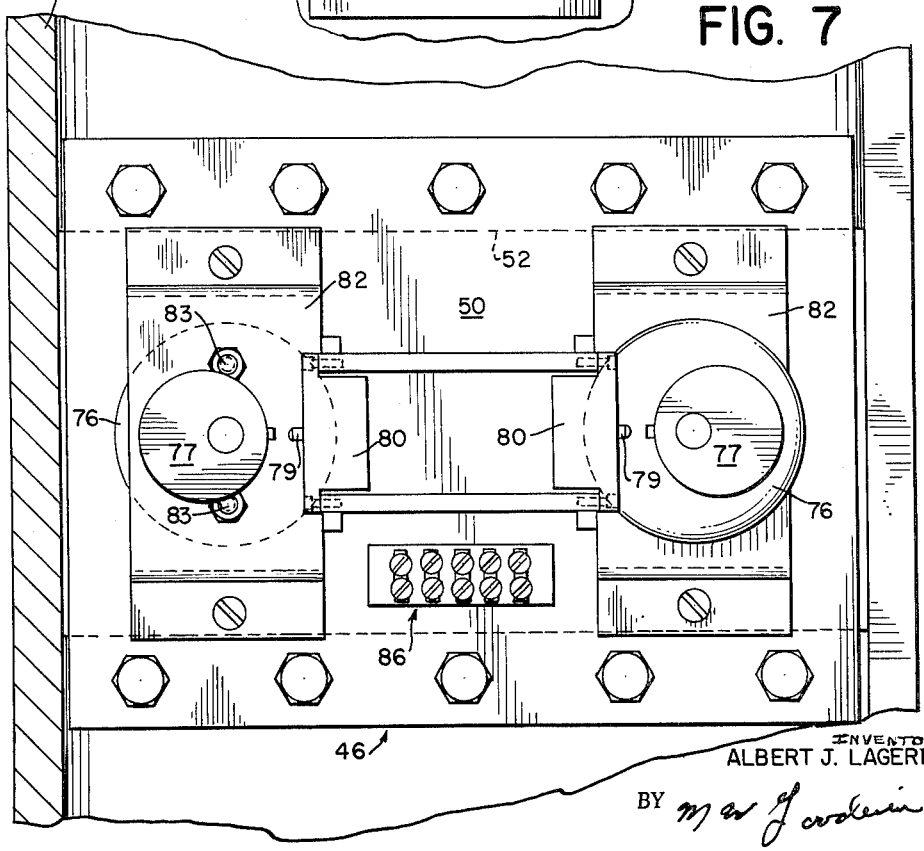
FIG. 7 is an end view of the brake means of FIG. 3.

Each of the cam shafts is biased in a direction to bring the rail engageable surfaces 60 of the cams into engagement with the associated rail by a torsion spring 68 disposed on the side of the cam block opposite the cams and arranged coaxially over the outer ends of the cam shafts. One end of each spring is connected to the outer end of the respectively associated cam shaft. The other end of the spring is anchored to a washer or annular member 70. As shown in FIGS. 5 and 6, the washer or adjusting member 70 is rotatably carried on the shaft and has an annular boss or projection extending into the bar in the cam block in which the bushing 52 is received. A bolt or screw 72 is threadably received in the cam block and serves to clamp a washer 74 to the adjusting ring 70 so as to clamp the adjusting ring to the cam block by outward threading of the screw 72. The adjusting ring 70 may be rotated about the axis of the cam shaft to preload the torsion spring 68 in a direction which will cause the spring to bias the cam toward the guide rail and into wedging locking relationship therewith.

In order to move the cams out of engagement with the guide rails and maintain the cams and guide rails in disengagement, there is provided in association with each cam a rotary solenoid 76, the operating shaft of which extends beyond opposite ends of the solenoid housing. One end of the shaft is resiliently drivingly connected to the associated cam shaft by a spring 78 which is generally rectangular in shape and fits within slots extending diametrically of the cam shaft and solenoid shaft respectively. The opposite end of each solenoid shaft carries an eccentric plate cam 77 which is most clearly shown in FIG. 7. It is operatively associated with the plunger 79 of an electrical switch 80. Each of the switches 80 is suitably supported on the cam block 50. Each of the solenoids is mounted on the cam block 50 by a bracket 82. Each of the solenoids is provided with a pair of studs 83 which extend through elongated slots (not shown) in the bracket whereby the solenoid may be angularly adjusted about the axis of the solenoid shaft. A removable cover 84 is provided for the brake assembly components just described, as well as for a terminal block 86. Rectifier resistors are associated with the solenoids which will be described in more detail hereinafter.

In the use of the braking means of this invention, the solenoids are normally energized to maintain the cams out of engagement with the respectively associated guide rails. Should, however, there be a failure in the lifting or drive system for the crane which would cause the cab or fork assembly to fall, the solenoids will be de-energized whereby the springs 68 will urge the cams into engagement with the opposite sides of the guide rails. As will be apparent from a consideration of FIG. 4, the cams engaged with the rail 20, any tendency of downward movement of the rail 20, or in other words the mast section 16, will effect a firm wedging engagement between the cams and guide rail to fix the intermediate mast relative to the fixed mast.

In the case of the brake means 48, the cams 54 are reversed with reference to the showing in FIG. 4, inasmuch as the cams and cam block are carried by the fork assembly and it is desired to prevent downward movement of the fork assembly relative to the intermediate mast section by wedging engagement between the cams and the rail 22 on the intermediate mast 16. Also the torsion springs and solenoids would be reversely oriented relative to the springs of the brake means 46 in order to provide urging and driving of the cams into and out of rail engagement.

Figure 8:
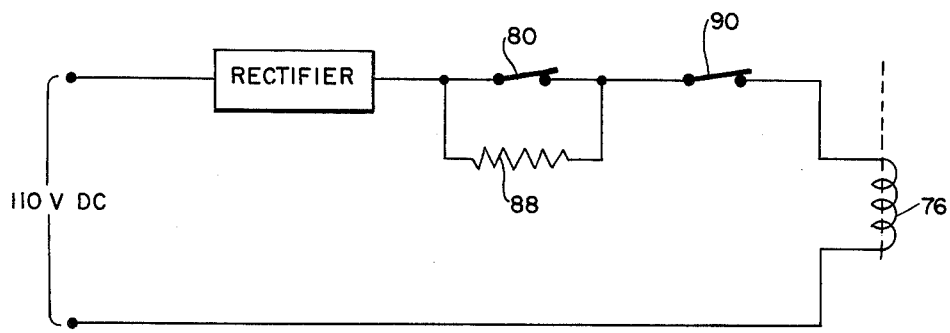
FIG. 8 is a schematic diagram illustrating an exemplary electrical control system for the brake means of the present invention.
Figure 9:
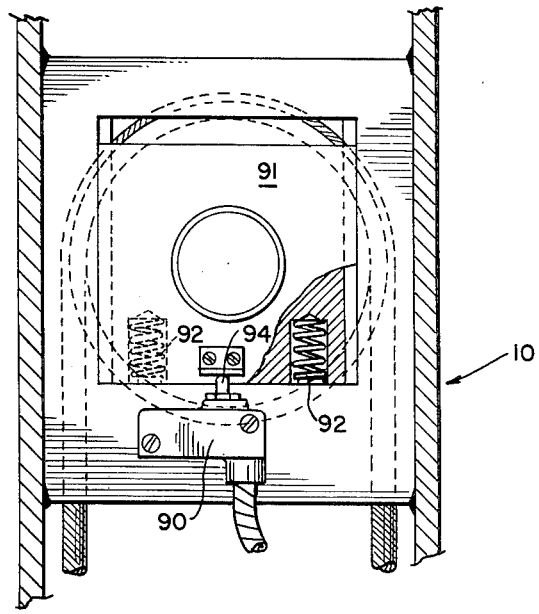
FIG. 9 is a fragmentary end view of a portion of the crane of FIG. 1 illustrating an exemplary means for effecting actuation of the brake means of this invention.

In FIG. 8, there is shown an exemplary wiring diagram for the solenoids of the brake means 46, 48. In the interest of brevity only one solenoid is shown, it being understood that a similar control is provided for each solenoid. In this specific embodiment shown, the solenoid is adapted to be operated from a rectifier providing an output of 110 volts D.C. One side of the rectifier is connected to one side of the solenoid. The other side of the rectifier is connected to one side of a normally open switch 80 which is connected in parallel with a resistance 88. The switch 80 and resistance 88 are connected to one side of a normally closed switch 90, the other end of the switch being connected to the other side of the solenoid. The switch 90 might form a part of a slack cable mechanism such as shown in FIG. 9. In the slack cable device of FIG. 9, a shaft for pulleys carrying the lifting cables is suitably supported on the bridge assembly. The axle or shaft for the pulley is journalled in a plate 91 which is slidably supported for vertical movement. A pair of springs 92 tend to urge the plate in an upward direction. The plate 91 as shown is bottomed in its supporting assembly due to a load on the cable. However, should the cable part, the springs 92 will urge the plate 91 upwardly to permit raising of the plunger 94 of the normally open switch 90 and thus breaking the circuit to the solenoid 76. Thus, returning to a consideration of FIG. 8, with the load being lifted by the crane, the switch 90 will be closed while the switch 80 will be open. Accordingly, current flow from the rectifier will be through the resistor 88 which will result in a lower voltage being applied to the solenoid. In a specific embodiment, this voltage is 35 volts rather than 110 volts nominal voltage of the solenoid. However, this voltage is sufficient to hold in the solenoid and maintain the respective cam 54 out of engagement with the associated rail, while at the same time small enough to permit the solenoids to be operated continuously. Should the cable break, the switch 90 will open, thus de-energizing the solenoid whereby the spring 68 will engage the cam with the rail. When the failure has been corrected and the switch 90 again closed, the switch 80 will now be closed due to the fact that on de-energizing of the solenoid the solenoid shaft will have been rotated sufficiently to engage the cam 76 with the switch plunger 78 and close the switch 80. Accordingly, the full line voltage of the rectifier will now be applied to the solenoid to effect disengagement of the cam from the guide rail. The resilient drive spring 78 between the solenoid and cam shaft permits rotation of the solenoid shaft without simultaneous corresponding rotation of the cam shaft and thus permits the solenoid to be seated even though the cam may temporarily be lodged against the rail. The rotation of the solenoid shaft in a cam will result in disengaging direction in the cam 76 on the outer end of the solenoid shafts being disengaged from the plunger 78 of the switch 80 to open the switch whereby the solenoids will now be in holding condition with a reduced voltage applied thereto.

It will be apparent to those skilled in the art that other means could be utilized for energizing and de-energizing the solenoids in response to a failure in the lifting mechanism of the crane. Also, it will be apparent that the brake means of this invention is fail safe in that if the solenoids inadvertently become de-energized, the cams will automatically be set into engagement with the guide rails and will prevent lowering of the intermediate mast or fork assembly until the electrical failure has been corrected. While the invention has been described in a preferred embodiment utilizing rotary solenoids, it will also be apparent to those skilled in the art that reciprocating solenoids could be used to rotate the cam shafts 56. For example, the plunger of a reciprocal solenoid could be connected to the outer end of the cam shaft by a pivoted link or by other suitable connecting mechanisms.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language might be said to fall therebetween.

I claim:

1. In a stacker crane having a mast assembly including a first mast section and a second mast section movable relative to the first section, power means for effecting lifting of said second mast section relative to said first mast section; brake means for locking said second mast section relative to said first mast section in the event of failure or ineffectiveness of said power means which would permit said second mast section to fall comprising cooperating braking means carried by said mast sections including movable cam means on one mast section, means tending to urge said cam means into wedging engagement with cooperating means on the other mast section, electrically actuated drive means carried by said one mast section for moving said cam means out of engagement with said cooperating means on said other mast section and for maintaining said cam means out of engagement therewith, and means for energizing said drive means when said power means is effective to prevent dropping of said second mast section and for de-energizing said drive means when said power means becomes ineffective to prevent dropping of said second mast section.

2. In a stacker crane having a depending mast assembly including a first mast section and a second mast section movable relative to said first mast section, cooperating guide means on said first and second mast including a guide bar on one mast section, and power means for effecting lifting of said second mast section relative to said first mast section; means for locking said second mast section relative to said first mast section in the event of failure or ineffectiveness of said power means which would permit said second mast section to fall comprising a pair of rotatably mounted eccentric cams carried by the other of said mast sections and wedgingly engageable with opposite sides of said guide bar on said one mast section, means tending to urge said cams into engagement with said guide bar, electrically actuated drive means for moving said cams out of guide bar engagement and for maintaining said cams out of guide bar engagement, and means for energizing said drive means and maintaining the same energized when said power means is effective to prevent dropping of said second mast section and for deenergizing said drive means when said drive means becomes ineffective to prevent dropping of said second mast section.

3. In a stacker crane having a depending mast assembly including a vertically fixed mast, an intermediate mast movable vertically of the fixed mast and a material supporting assembly movable vertically relative to the intermediate mast and the fixed mast, an operator's cab carried by one of the intermediate mast and material supporting assembly, and power means for effecting lifting of said intermediate mast and material supporting assembly; brake means for locking said material supporting assembly to said intermediate mast and for locking said intermediate mast relative to said fixed mast in the event of ineffectiveness of said power means to prevent falling of said intermediate mast and material supporting assembly comprising first cam means acting between said fixed mast and intermediate mast and second cam means acting between said intermediate mast and material supporting assembly, said first cam means including a self-wedging cam on one of the fixed and intermediate masts, said second cam means including a self-wedging cam on one of the intermediate mast and material supporting assembly, said cams being constructed and arranged to provide self-wedging engagement between the cams and cooperating surfaces on the other of said fixed and intermediate masts and the other of said intermediate masts and material supporting assembly respectively in response to engagement of the cams with said cooperating surfaces and a tendency of said intermediate mast and material supporting assembly to fall relative to said fixed mast, means tending to urge said cams into engagement with said cooperating surfaces, electrically energized drive means drivingly connected to said cams and maintaining said cams out of engagement with said cooperating surfaces, and means for energizing said drive means when said power means is effective to prevent dropping of said intermediate mast and material supporting assembly and for deenergizing said drive means when said power means becomes ineffective to prevent dropping of said intermediate mast and material supporting assembly.

4. In a stacker crane as described in claim 3, each of said cams being rotatably mounted and being provided with a wedging portion extending eccentrically of the cam axis and a bearing surface disposed concentrically of the cam axis, means fixed relative to the axes of each cam and providing a bearing surface disposed concentrically of the cam axis and engageable with the bearing surface on the cam to support the radial load on the cam when the cam is engaged with the respective cooperating surface, a preloaded torsion spring associated with each cam and urging the same toward engagement with the respective cooperating surface, said drive means associated with each cam including a solenoid drivingly connected to each cam.

5. In a stacker crane as described in claim 4, means for applying a predetermined voltage to the solenoids driving said cams to disengage the cams from said cooperating surfaces and for applying a reduced voltage to said solenoids to maintain said cams out of engagement with said cooperating surfaces in response to movement of said cams out of engagement with said cooperating surfaces.

6. In a stacker crane as described in claim 5, each of said solenoids having a rotatable output shaft, a resilient drive connection between the solenoid output shafts and the cam, and means for selectively adjusting the preloading of said torision spring.

7. In a stacker crane and the like, a vertically extending mast assembly comprising a first and second mast, means supporting said second mast on said first mast for vertical movement relative thereto comprising a plurality of rollers on one of the masts and a guide bar on the other mast extending longitudinally thereof and engaged by said rollers, power means for effecting vertical movement of said second mast relative to first mast, and means for preventing falling of said second mast relative to said first mast in the event of ineffectiveness of said power means to prevent falling of said second mast comprising a cam block carried by said one mast, a pair of shafts journalled on said cam block and disposed on opposite sides respectively of said guide bar with the shafts extending parallel to the sides of the bar, a pair of cams mounted on said shafts for rotation therewith and having eccentrically arranged guide bar engageable wedging portions engageable with the opposite sides respectively of the guide bar, spring means urging such shafts in a direction to engage said eccentrically arranged portions to the cams with said guide bar thereby to lock the second mast relative to the first mast with respect to downward movement of the second mast, a solenoid drivingly connected to each shaft and when energized acting to move said cams in a direction away from said guide bar, and means for energizing said solenoids when said power means is effective to prevent dropping of said second mast and for deenergizing said solenoids when said power means is ineffective to prevent dropping of said second mast.

8. In a stacker crane as described in claim 7 each of said cams further including a bearing surface extending concentrically of this axis thereof, the cam block being provided with a pair of bearing surfaces respectively engageable with the bearing surfaces on the cams and each generally facing the next adjacent side of the guide bar thereby to support the radial load on the cams and shafts when the cams are engaged with the guide bar in locking engagement.

9. In a stacker crane as described in claim 8 said means for energizing said solenoids including means for applying a predetermined nominal voltage to said solenoids to effect disengagement of the cams from the guide bar and for applying a reduced voltage to said solenoids in response to disengagement of said cams from said guide bar.

10. In a stacker crane as described in claim 7 said one mast being provided with an opening within which a portion of said cam block is received, locating means on said one mast section fixed relative thereto and providing a shoulder engageable by a cooperating shoulder on said cam block whereby vertical loading on said cam block is transferred directly to said one mast, said cam block being removably mounted on said one mast.

11. In a stacker crane as described in claim 7 said spring means comprising a torsion spring connected at one end to one end of each cam shaft and connected at its other end to an adjustable member rotatably mounted on said cam block for selective movement coaxially of the cam shaft, and means for releasably locking said adjusting member in selected adjusted position corresponding to a predetermined preloading of said torsion spring.

12. In a stacker crane as described in claim 9 said means for providing a reduced voltage to each of said solenoids comprising a control cam associated with each solenoid and drivingly connected thereto, a normally open switch in series with the solenoid, a resistance in parallel to said switch, said control cam being operatively associated with the switch for closing said switch in response to movement of the associate guide bar engageable cam into guide bar engagement and for opening said switch in response to a predetermined amount of movement of said guide bar associated cam in a direction out of guide bar engagement.

13. In a stacker crane as described in claim 7 each of said solenoids having a rotatable drive shaft, resilient drive means connecting each solenoid drive shaft to the respectively associated cam shaft, and means adjustably mounting each solenoid on the cam block to permit adjustment of the solenoid about the axis of the drive shaft thereof.

References Cited by the Examiner

UNITED STATES PATENTS

| 722,894 | 3/1903 | Potter | 187—73 |
| 1,422,774 | 7/1922 | McGillivray | 187—87 |
| 1,924,320 | 8/1933 | James | 188—171 |
| 2,493,553 | 1/1950 | Sahlin | 187—87 |

FOREIGN PATENTS

| 1,005,903 | 4/1957 | Germany. |

HUGO O. SCHULZ, *Primary Examiner.*